United States Patent
Kirk

(10) Patent No.: US 10,451,725 B2
(45) Date of Patent: Oct. 22, 2019

(54) SYSTEMS AND METHODS FOR PERFORMING VEHICLE COLLISION-AVOIDANCE WARNING VIA SENSOR PULSE

(71) Applicant: Honeywell International Inc., Morris Plains, NJ (US)

(72) Inventor: James C. Kirk, Clarksville, MD (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/359,692

(22) Filed: Mar. 20, 2019

(65) Prior Publication Data

US 2019/0219684 A1 Jul. 18, 2019

Related U.S. Application Data

(63) Continuation of application No. 13/888,216, filed on May 6, 2013, now Pat. No. 10,274,595.
(Continued)

(51) Int. Cl.
*G01S 13/66* (2006.01)
*G08G 5/06* (2006.01)
(Continued)

(52) U.S. Cl.
CPC ............. *G01S 13/66* (2013.01); *B60Q 9/008* (2013.01); *B64C 25/42* (2013.01); *B64D 43/00* (2013.01);
(Continued)

(58) Field of Classification Search
CPC .... B64F 1/00; B64F 1/36; G08G 5/00; G08G 5/04; G08G 5/06; G08G 5/065; G08G 5/0026; G08G 5/0043; G08G 1/167
(Continued)

(56) References Cited

U.S. PATENT DOCUMENTS 5,334,982 A * 8/1994 Owen ................. B64D 47/06
342/32
7,379,014 B1 5/2008 Woodell et al.
(Continued)

FOREIGN PATENT DOCUMENTS

CA 2549870 A1 12/2007
CN 1979517 A 6/2007
(Continued)

OTHER PUBLICATIONS

Response to Examination Report dated Feb. 7, 2014, from counterpart European Patent Application No. 13184591.9, filed May 27, 2014, 13 pages.
(Continued)

*Primary Examiner* — Steven Lim
*Assistant Examiner* — Mancil Littlejohn, Jr.
(74) *Attorney, Agent, or Firm* — Shumaker & Sieffert, P.A.

(57) ABSTRACT

Systems and methods for embedding a warning signal in a sensor pulse. When a taxi anticollision system of a host aircraft senses a threat headed for the aircraft, a warning signal is embedded in a sensor pulse to warn the offending vehicle that it is in the field of view of the host aircraft's sensor and is moving on a trajectory that is threatening collision with the host aircraft. Alternately, the radar issues a dedicated pulse for reading and alerting the receiving device.

12 Claims, 2 Drawing Sheets

Related U.S. Application Data

(60) Provisional application No. 61/706,632, filed on Sep. 27, 2012.

(51) Int. Cl.

| | | |
|---|---|---|
| *G08G 5/04* | (2006.01) | |
| *B64D 43/00* | (2006.01) | |
| *B64D 45/00* | (2006.01) | |
| *G01S 13/93* | (2006.01) | |
| *B64C 25/42* | (2006.01) | |
| *G01S 13/76* | (2006.01) | |
| *G01S 7/04* | (2006.01) | |
| *G01C 23/00* | (2006.01) | |
| *B60Q 9/00* | (2006.01) | |

(52) U.S. Cl.
CPC ............ *B64D 45/00* (2013.01); *G01C 23/00* (2013.01); *G01S 7/04* (2013.01); *G01S 13/765* (2013.01); *G01S 13/93* (2013.01); *G01S 13/931* (2013.01); *G08G 5/04* (2013.01); *G08G 5/045* (2013.01); *G08G 5/065* (2013.01); *G01S 2013/9335* (2013.01); *G01S 2013/9339* (2013.01)

(58) Field of Classification Search
USPC .......................................................... 340/945
See application file for complete search history.

(56) References Cited

U.S. PATENT DOCUMENTS

| | | | | |
|---|---|---|---|---|
| 7,783,427 | B1* | 8/2010 | Woodell .................. | G01S 7/003 |
| | | | | 701/301 |
| 7,979,197 | B2* | 7/2011 | Finn ........................ | G08G 5/065 |
| | | | | 701/117 |
| 8,115,650 | B2* | 2/2012 | Dasilva ................. | G08B 25/016 |
| | | | | 340/539.1 |
| 9,035,759 | B2* | 5/2015 | Wietfeld ................ | G08G 1/166 |
| | | | | 340/435 |
| 9,230,419 | B2* | 1/2016 | Beggs .................. | B60Q 1/2673 |
| 2002/0154061 | A1 | 10/2002 | Frazier, Jr. et al. | |
| 2005/0073438 | A1 | 4/2005 | Rodgers et al. | |
| 2005/0107934 | A1 | 5/2005 | Gudat et al. | |
| 2007/0164896 | A1 | 7/2007 | Suzuki et al. | |
| 2008/0062011 | A1* | 3/2008 | Butler ..................... | G01S 3/783 |
| | | | | 340/961 |
| 2008/0172148 | A1 | 7/2008 | Isorce et al. | |
| 2010/0194603 | A1 | 8/2010 | Wobben | |
| 2011/0249118 | A1 | 10/2011 | Bruno | |
| 2013/0176144 | A1 | 7/2013 | Wieffeld et al. | |
| 2013/0321176 | A1 | 12/2013 | Vasek et al. | |
| 2013/0321177 | A1 | 12/2013 | Kirk | |
| 2013/0321194 | A1 | 12/2013 | Kirk et al. | |

FOREIGN PATENT DOCUMENTS

| | | |
|---|---|---|
| CN | 101004780 A | 7/2007 |
| CN | 101004861 A | 7/2007 |
| CN | 101122957 A | 2/2008 |
| CN | 101593437 A | 12/2009 |
| CN | 101989383 A | 3/2011 |
| CN | 202193050 U | 4/2012 |
| DE | 102010022282 A1 | 12/2011 |
| JP | H07306995 A | 11/1995 |
| JP | 2000019246 A | 1/2000 |
| JP | 2001021644 A | 1/2001 |
| JP | 3421058 B2 | 6/2003 |
| JP | 2004258898 A | 9/2004 |
| JP | 2007132768 A | 5/2007 |
| JP | 2007310587 A | 11/2007 |
| JP | 2008123014 A | 5/2008 |
| JP | 2008181200 A | 8/2008 |
| WO | 03009254 A1 | 3/2003 |
| WO | 2011151291 A1 | 12/2011 |

OTHER PUBLICATIONS

Examination Report from counterpart European Application No. 13184591.9, dated Feb. 11, 2016, 5 pp.
"Introduction to TCAS II" Version 7.1, U.S. Department of Transportation, Federal Aviation Adminstration, Feb. 28, 2011, 50 pp.
Response to Examination Report dated Feb. 11, 2016, from counterpart European Application No. 13184591.9, filed Jun. 8, 2016, 9 pp.
Examination Report from counterpart European Application No. 13184591.9-1812, dated Oct. 27, 2016, 5 pp.
First Office Action and Search Report, and translation thereof, from counterpart Chinese Application No. 201310541012.0, dated Sep. 20, 2016, 21 pp.
Jin et al., "Design and Simulation for Integrated Digital Intermediate Frequency Receiving System of TCAS and Mode S Transponder Based on FPGA", Chinese Master's Dissertations, Engineering Science and Technology II, Jul. 2011, in the Chinese language (with an English Abstract provided by Globe Thesis, on Nov. 2012), 9 pp.
The Notification of Reason for Rejection, and translation thereof, from counterpart Japanese Application No. 2013-193206, dated Jun. 26, 2016, 21 pp.
Second Office Action, and translation thereof, from counterpart Chinese Application No. 201310541012.0, dated Jun. 14, 2017, 14 pp.
Notification to Grant, and translation thereof, from counterpart Chinese Application No. 201310541012.0, dated Oct. 30, 2017, 6 pp.
The Notification of Reason for Rejection, and translation thereof, from counterpart Japanese Application No. 2013-193206, dated Feb. 14, 2018, 13 pp.
Examination Report from counterpart European Application No. 13184591.9, dated May 22, 2018, 5 pp.
Response to Examination Report dated May 22, 2018, from counterpart European Application No. 13184591.9, filed Sep. 17, 2018, 12 pp.
Intent to Grant dated Nov. 12, 2018, from counterpart European Application No. 13184591.9, 17 pp.
Response to Examination Report dated Oct. 27, 2016, from counterpart European Application No. EP13184591.9, filed Feb. 7, 2017, 3 pp.
Search Report from counterpart EPC Patent Application No. 13184591.9 dated Jan. 27, 2014. 3 pp.
Examination Report from counterpart EPC Patent Application No. 13184591.9 dated Feb. 7, 2014. 6 pp.
"Ground Vehicle Runway Incursion Prevention Alerting System Literature Review," U.S. Department of Transportation, Federal Aviation Administration, Nov. 2012, 25 pp.
Kwag, et al., Collision Avoidance Radar for UAV (abstract only), Hankuk Aviation University, Seoul, Oct. 16-19, 2006, 2pp.
U.S. Appl. No. 13/889,537, filed May 8, 2013 by Dusik et al. (all pages).
Prosecution History from U.S. Appl. No. 13/888,216, dated Apr. 3, 2015 through Feb. 20, 2019, 90 pp.
Decision to Grant dated Nov. 2, 2018, and machine translation thereof, from counterpart Japanese Application No. 2013-193206, 5 pp.

\* cited by examiner

SYSTEMS AND METHODS FOR PERFORMING VEHICLE COLLISION-AVOIDANCE WARNING VIA SENSOR PULSE

PRIORITY CLAIM

This application is a continuation of U.S. application Ser. No. 13/888,216, filed May 6, 2013, which claims the benefit of U.S. Provisional Application Ser. No. 61/706,632, filed Sep. 27, 2012, the contents of each of which are hereby incorporated by reference in their entirety. The entire content of U.S. Provisional Application Ser. No. 61/653,297, filed May 30, 2012, is also incorporated by reference herein.

BACKGROUND OF THE INVENTION

Current methods of receiving a timely warning of impending collision between parked or taxiing aircraft vehicles and a host ground vehicle are costly. These solutions may fail to provide effective warning to the other vehicles.

SUMMARY OF THE INVENTION

The present invention provides systems and methods for embedding a warning signal in a sensor pulse. When a taxi anticollision system of a host aircraft senses a threat headed for the aircraft, a warning signal is embedded in a sensor pulse to warn the offending vehicle that it is in the field of view of the host aircraft's sensor and is moving on a trajectory that is threatening collision with the host aircraft. Alternately, the radar issues a dedicated pulse for reading and alerting the receiving device.

In one aspect of the invention, the vehicle includes a receiver that, when it receives the coded warning, alerts the driver that caution must be observed.

In another aspect of the invention, vehicles outside the field of the host aircraft's sensor do not receive a warning or act on a received warning. The warning is a "broadcast" made to only those receivers in the beam of the sensor (i.e., in the radio transmission field). Other receivers may hear the signal due to multipath reflections, etc. —but a threshold set at the vehicles' receivers will eliminate most of those types of false warning.

In still another aspect of the invention, the host aircraft's sensor performs beamshaping to further narrow the field-of-view, thereby reducing the number of detectable vehicles.

In yet another aspect of the invention, the aircraft's sensor reads an RFID device embedded in a receiver on the target vehicle and correlates the location of the detected RFID receiver with the exact location returned by the radar (if the radar is so capable). Thus, a warning is issued to only that correlated receiver without sending an alarm to other receivers or operators in the sensor field.

In still yet another aspect of the invention, the host aircraft system performs beamshaping to narrow the field of the transmitted pulse warning to reduce the number of vehicles that receive the warning. This is different from narrowing for detection. The radar could have a wide field of view for finding threats, but when sending an alert, narrows the alert beam separately from beamforming related to detection.

In a still further aspect of the invention, the host aircraft system reads an RFID device embedded in the receiver of the target and sends a warning only to that device by using a unique address for that device, thus reducing the number of false alarms or irrelevant alarms sent to the operators of the receivers (drivers and equipment operators).

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
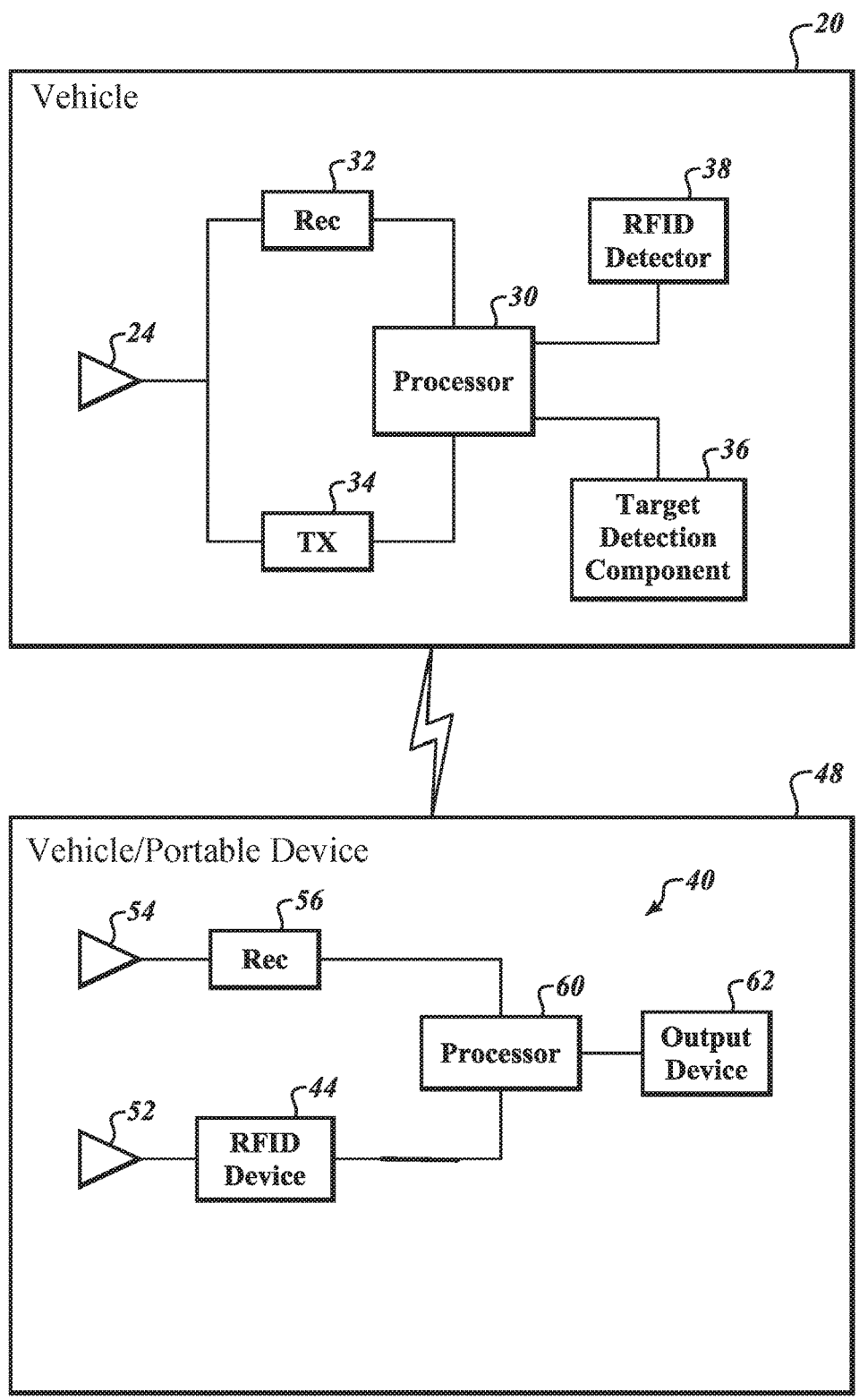
FIG. 1 is a block diagram of exemplary systems configured in accordance with an embodiment of the present invention.

As shown in FIG. 1, a first vehicle 20 (e.g., taxiing aircraft, ground-based support vehicle, etc.) includes an antenna 24, a radar processor 30, a receiver 32, a transmitter 34, a radio frequency identification (RFID) tag detection component 38, and a target detection component 36.

The radar components (the radar processor 30, the receiver 32, and the transmitter 34) generate and emit a radar pulse via the antenna 24. Based on radar pulse return, the processor 30 detects and determines the coordinates of any obstacles, such as nearby service vehicles. The emitted radar pulse may include a RFID read pulse. The emitted signal reads a passive (unpowered) RFID device 44 that is part of a receiver and alerting device 40 located in/on a second vehicle/device 48, such as an aircraft, ground personnel, or ground equipment.

Return signals received at the antenna 24, the receiver 32, and the processor 30 are sent to the target detection component 36. RFID read information included in the received signals is sent to the RFID tag detection component 38. The components 36, 38 may be separate hardware processors, partitioned functions within the processor 30, or an integrated processing function. The target detection component 36 determines the track of the device 48 and, based on the determined track, determines whether the vehicle/device 48 is on a collision course with the vehicle 20 (i.e., the vehicle 20 is moving or the detected object is moving, or both). Then the processor 30 and/or the tag detection component 38 checks for a correlated RFID tag associated with the second vehicle/device 48 that is on a collision course. If an RFID tag is present, the processor 30 generates an alarm and attaches information associated with the vehicle/device 48 and/or the receiver and alerting device 40 included in the RFID tag to the alarm. The generated alarm is then transmitted.

The receiving and alerting device 40 includes a receiver antenna 54, a receiver 56, a processor 60, an output device 62, and a passive RFID antenna 52 connected to the RFID device 44. The RFID antenna 52 and the RFID device 44 may be included in a single integrated package. The RFID device 44 and the RFID antenna 52 provide identity information of the device 40 and or the device 48 when the vehicle 20 issues the read pulse.

RFID devices are configured to be passive. For example, the RFID device alters the reflected pulse from a passively received radar or radio pulse signal. Range for reading an RFID device is determined by the beampattern of the transmitter/receiver of the querying device.

One of ordinary skill in RFID design will be to balance the power of the radar pulse transmissions with the size of the passive antenna on the RFID device without undue experimentation to insure there is enough "target corss section" to capture and return the ID signal.

In one embodiment, when the receiver 56 is off, the processor 60 shorts the RFID device 44, thereby removing the ability to be read. When the receiver 32 and the processor 30 do not receive RFID information (RFID number (ID)) in response to a read pulse, the processor 30 determines that it cannot send a receiver-specific warning to the device 40. When the receiver 56 is on, the RFID device 44 communicates its RFID number to the processor 60. The processor 60 keeps the RFID device 44 active as a result of the receiver's 56 being on. The antenna 54 and the radar pulse receiver 56 receive incoming warnings with identification information (ID) and send them to the processor 60. The processor 60 correlates the ID in the received warning with the RFID ID of the RFID device 44 to determine if the warning is for the device 40. If the warning is meant for the device 40, the processor 60 generates an alarm signal that is sent to the output device 62. In response to receiving the alarm signal, the output device 62 produces an audio, a visual, and/or a haptic alarm. The type of output device alarm is based on a user's selection.

The RFID receiving and alerting device 40 may be:

carried in a shirt pocket;

clipped, mounted, or bonded to the vehicle (e.g., aircraft or ground support vehicle dashboard or windshield); and/or implemented in an electronic flight bag or comparable device (e.g., cell phones, tablet computer (Ipad)).

Alerts may be one or more of the following:

haptic (vibration or other touch sense);

audio (alarms, voice warning); and/or visual (flashing light, strobe, rotating light, etc.).

Figure 2:
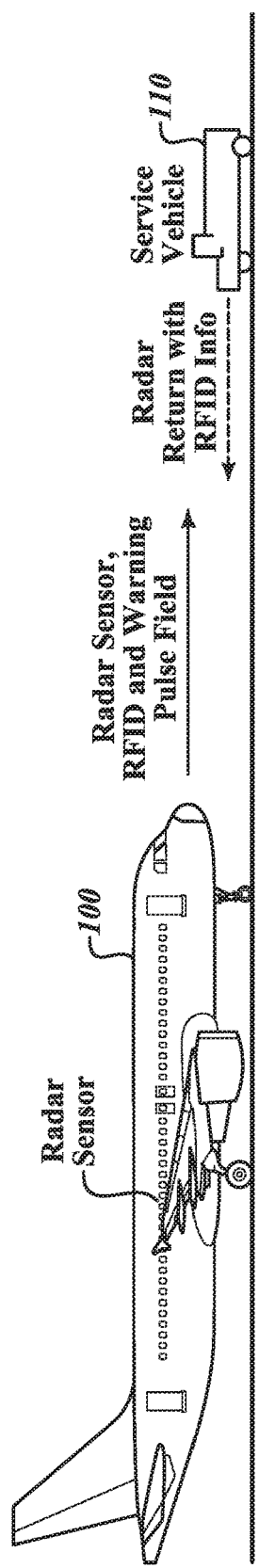
FIG. 2 is side view of exemplary vehicles equipped with the system shown in FIG. 1.

FIG. 2 shows a taxiing aircraft 100 that includes the components included in the vehicle 20 shown in FIG. 1. In one embodiment, the aircraft 100 includes a radar transceiver at the wingtip(s) that generates a read pulse. The generated read pulse is received at any proximate other vehicles, such as a service vehicle 110 that includes the receiving and alerting device 40. In response to receiving the read pulse, the receiving and alerting device 40 in the service vehicle 110 includes RFID information in a return signal generated as a result of receiving the read pulse. If the system within the aircraft 100 determines that the service vehicle 110 poses a collision threat, a warning signal that includes the RFID information for the service vehicle 110 is generated and transmitted. When the service vehicle 110 receives the warning signal, it determines that the warning signal is for the service vehicle 110, based on the RFID information, and outputs an alert to the operator of the service vehicle 110 as a result.

In one embodiment, the present invention is integrated into a radar-based anticollision system (ACS) designed to protect an entire aircraft, or various components, such as wingtips or engines. The hosting ACS may be a comprehensive protection system or may be directed at only partial coverage, such as wingtips or engine nacelles.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system comprising:
a first device comprising:
  at least one antenna;
  a receiver in signal communication with the at least one antenna;
  a passive radio frequency identification (RFID) device in signal communication with the at least one antenna, the passive RFID device configured to provide a return signal comprising RFID identification information via the at least one antenna in response to receiving a read pulse via the at least one antenna;
  a first processor; and
  an output device; and
a radar based anti-collision system for an aircraft, the anti-collision system including a second device, the second device comprising:
  a transceiver; and
  a second processor coupled to the transceiver and configured to transmit a radar signal that includes the read pulse via the transceiver, wherein the second processor is further configured to:
    receive the return signal from the passive RFID device,
    determine, based on a plurality of received return signals, a track of the first device,
    determine, based on the track of the first device, whether the first device and the second device are on a collision course, and
    send a warning signal to the first device in response to determining that the first device and the second device are on the collision course, the warning signal comprising warning identification information;
wherein the first processor is configured to:
  receive the warning signal from the second device via the receiver,
  determine whether the warning identification information in the warning signal matches the RFID identification information to determine if the warning signal is for the first device, and
  generate an alert signal in response to determining that the warning identification information matches the RFID identification information,
  wherein the output device is configured to provide an alert based on the generated alert signal.

2. The system of claim 1, wherein the first processor of the first device is further configured to determine a status of the receiver and deactivate the passive RFID device if the status of the receiver is in at least one of an off state or a standby state.

3. The system of claim 1, wherein the first device is located on an airport support vehicle.

4. The system of claim 1, wherein the first device is located on an aircraft.

5. The system of claim 1, wherein the radar signal is a first radar signal, and wherein the second device is configured to send the warning signal by at least embedding the warning signal in a second radar signal.

6. The system of claim 1, wherein the second device is configured to send the warning signal by at least beamshaping the warning signal.

7. A method comprising: transmitting, by a second device of a radar based anti-collision system of an aircraft, a radar signal that includes a read pulse;

receiving, by at least one antenna of a first device, the read pulse;
  providing, by a radio frequency identification (RFID) device of the first device that is in signal communication with the at least one antenna, a return signal comprising RFID identification information via the at least one antenna in response to receiving the read pulse;
  determining, by the second device, based on a plurality of received return signals, a track of the first device;
  determining, by the second device, based on the track of the first device, whether the first device and the second device are on a collision course;
  responsive to determining that the first device and the second device are on the collision course, sending, by the second device, a warning signal to the first device, the warning signal comprising warning identification information;
  receiving, by a receiver of the first device, the warning signal from the second device,
  determining, by the first device, whether the warning identification information in the warning signal matches the RFID identification information to determine if the warning signal is for the first device;
  responsive to determining that the warning identification information matches the RFID identification information, generating, by the first device, an alert signal; and
  outputting, by an output device of the first device, an alert based on the generated alert signal.

8. The method of claim 7, further comprising:
  determining, by the first device, a status of a receiver coupled to the at least one antenna; and
  deactivating, by the first device, the RFID device if the status of the receiver is in at least one of an off state or a standby state.

9. The method of claim 7, wherein the radar signal is a first radar signal, and wherein sending the warning signal includes embedding the warning signal in a second radar signal.

10. The method of claim 7, wherein sending the warning signal includes beamshaping the warning signal.

11. The method of claim 7, wherein the first device is located on an airport support vehicle.

12. The method of claim 7, wherein the first device is located on an aircraft.

* * * * *